US008782160B2

(12) United States Patent
Torii

(10) Patent No.: US 8,782,160 B2
(45) Date of Patent: Jul. 15, 2014

(54) CLUSTER CONTROL SYSTEM, CLUSTER CONTROL METHOD, AND PROGRAM

(75) Inventor: Takashi Torii, Tokyo (JP)

(73) Assignee: Nec Corporation, Tokyo (JP)

( * ) Notice: Subject to any disclaimer, the term of this patent is extended or adjusted under 35 U.S.C. 154(b) by 266 days.

(21) Appl. No.: 13/130,949

(22) PCT Filed: Dec. 2, 2009

(86) PCT No.: PCT/JP2009/070217
§ 371 (c)(1), (2), (4) Date: May 24, 2011

(87) PCT Pub. No.: WO2010/064644
PCT Pub. Date: Jun. 10, 2010

(65) Prior Publication Data
US 2011/0231508 A1 Sep. 22, 2011

(30) Foreign Application Priority Data
Dec. 3, 2008 (JP) ................................ 2008-308368

(51) Int. Cl.
*G06F 15/16* (2006.01)
*H04L 29/12* (2006.01)
*H04L 29/08* (2006.01)

(52) U.S. Cl.
CPC ........ *H04L 29/12028* (2013.01); *H04L 61/103* (2013.01); *H04L 67/1002* (2013.01)
USPC .......................................................... 709/208

(58) Field of Classification Search
CPC ................................................ H04L 29/12028
USPC ........................... 709/208–230; 370/235–402
See application file for complete search history.

(56) References Cited

U.S. PATENT DOCUMENTS

| | | | | |
|---|---|---|---|---|
| 5,894,479 | A * | 4/1999 | Mohammed | 370/401 |
| 2004/0071087 | A1* | 4/2004 | Siev et al. | 370/235 |
| 2004/0193716 | A1* | 9/2004 | McConnell | 709/228 |
| 2006/0107108 | A1* | 5/2006 | Geng et al. | 714/11 |

FOREIGN PATENT DOCUMENTS

| | | | |
|---|---|---|---|
| JP | 11-27320 | A | 1/1999 |
| JP | 2002232446 | A | 8/2002 |

(Continued)

OTHER PUBLICATIONS

International Search Report for PCT/JP2009/070217 mailed Jan. 26, 2010.

(Continued)

*Primary Examiner* — Xavier Szewai Wong
*Assistant Examiner* — Fangyan Deng
(74) *Attorney, Agent, or Firm* — Sughrue Mion, PLLC

(57) ABSTRACT

A slave computer out of a plurality of slave computers that are connected to a plurality of clients through a front network and provide the front network with a single IP address that is a same IP address comprises: a responsible client table that indicates a client for which each of the plurality of slave computers is responsible; and an ARP processing unit that refers to the responsible client table when an ARP request for the single IP address has been received from one of the plurality of clients and sends an ARP response when a client that has sent the ARP request is present in the responsible client table, and otherwise does not send the ARP response, wherein a client in the responsible client table is added, changed, or deleted by a master computer connected through a back-end network.

19 Claims, 10 Drawing Sheets

(56) References Cited

FOREIGN PATENT DOCUMENTS

| | | | |
|---|---|---|---|
| JP | 2004046442 | A | 2/2004 |
| JP | 2005167425 | A | 6/2005 |
| JP | 2006106933 | A | 4/2006 |
| JP | 2006259845 | A | 9/2006 |

OTHER PUBLICATIONS

H. Fujita et al., "Flexible Load Balancing on Distributed Single IP Clusters", IPSJ SIG Technical Report, 2007-OS-106 (1), Aug. 3, 2007, pp. 1-8

* cited by examiner

FIG. 3

CLIENT ASSIGNMENT TABLE 32

| CLIENT IP ADDRESS | CLIENT MAC ADDRESS | ASSIGNED SLAVE NODE IP ADDRESS | Last ARP Time |
|---|---|---|---|
| 10.10.10.1 | 00:00:00:00:00:01 | 192.168.1.10 | 10 min. before |
| 10.10.10.5 | 00:00:00:00:00:02 | 192.168.1.11 | 5 second before |

SLAVE NODE TABLE 33

| SLAVE NODE IP ADDRESS | STATUS | Last Access Time |
|---|---|---|
| 192.168.1.10 | NORMAL | 1 min. before |
| 192.168.1.11 | ERROR | 10 hours before |

RESPONSIBLE CLIENT TABLE 42

| CLIENT IP ADDRESS | CLIENT MAC ADDRESS | Last Access Time |
|---|---|---|
| 10.10.10.1 | 00:00:00:00:00:01 | 10 min. before |
| 10.10.10.5 | 00:00:00:00:00:02 | 5 second before |

CLUSTER CONTROL SYSTEM, CLUSTER CONTROL METHOD, AND PROGRAM

CROSS-REFERENCE TO RELATED APPLICATION

The present invention is the National Phase of PCT/JP2009/070217, filed Dec. 2, 2009, which is based upon and claims the benefit of the priority of Japanese Patent Application No. 2008-308368 (filed on Dec. 3, 2008), the disclosure of which is incorporated herein in its entirety by reference.

TECHNICAL FIELD

The present invention relates to a cluster control system, a cluster control method, and a program. More specifically, the invention relates to a cluster control system, a cluster control method, and a program for performing control over a distributed load balancing cluster.

BACKGROUND

Servers are often clustered so as to make a system to be fault-tolerant and extendable. Traditionally, fail-over clusters have often been used. An active system and a standby system are provided for these fail-over clusters. When a problem has occurred in the active system, operation is continued by switching to the standby system. However, the fail-over clusters have a disadvantage that the standby system at a normal time is not effectively utilized as resources. Power consumption is highlighted, being triggered by global warming. Load balancing clusters, in which both of active and standby systems take charge of processes, are therefore demanded in such a situation.

The load balancing clusters are broadly classified into a single IP (Internet Protocol) address type and a multiple IP address type.

The single IP address type is a system in which a plurality of servers are seemed to have one IP address for all clients, so that the servers look as if they were one server.

On contrast therewith, the multiple IP address type is a system in which a different IP address is presented for each client to make access to a corresponding server. In the multiple IP address system, in order to cause different IP addresses to look as if they were one address, it is arranged to set the different IP addresses to represent a server name on a name resolution layer for resolving the IP address itself (resolution of the IP address from the server name). As a typical method of the multiple IP address system, DNS (Domain Name Server) load balancing or the like is known.

That is, in the multiple IP address system, name resolving means such as a DNS is necessary, and a problem may arise at an application level because different IP addresses are presented as clients.

Accordingly, in the load-balancing clusters, the single IP address type, for which an influence on an application does not need to be considered, is desirable.

The single IP address type can be broadly divided into the following two systems.

A first system is a representative node type. This system includes one representative node having a single IP address presented to a client and a plurality of back-end nodes having respective IP addresses. In this system, all packets from the client pass through the representative node, and are transferred to the backend nodes assigned for respective sessions. In this case, there are a method in which a response packet passes through the representative node and a method in which the response packet directly returns to the client without passing through the representative node. Usually, the representative node receives all the packets from the client to perform load balancing. Accordingly, there is an advantage that various load balancing algorithms can be applied while holding various information. However, the representative node tends to become a performance bottle neck, or an SPOF (Single Point Of Failure: single point of failure), which may be pointed out as a disadvantage. For that reason, the representative node is implemented, for example, on a hardware basis, using an ASIC (Application Specific Integrated Circuit: custom IC).

A second system is a distribution type. In this system, it is arranged that all nodes have a same IP address, and a packet from a client arrives at all the nodes. One of the nodes performs a process on the packet that has arrived, and returns the processed packet. It is a common practice to use the IP address of the client as a key to determine the node for processing the packet. In this system, each of the nodes must immediately determine itself whether to perform a process, for each packet. Accordingly, a complex load balancing algorithm cannot be applied. Unlike the representative node type, the distribution type has no SPOF, and it scarcely happens that the nodes become bottlenecks. As disadvantages, the following respects may be pointed out. That is, since packet acceptance must be immediately determined as mentioned above, a flexible load balancing algorithm is difficult to apply and loads may be centralized on a specific node. Since a HUB or switch port mirroring is used to cause the packet to be sent to all the nodes, a network itself becomes a bottleneck. Non-patent Document 1 allows application of a flexible load balancing algorithm by being configured as the distribution type and by providing a master node.

As described above, there are the representative node type and the distribution type in the load balancing cluster of the single IP address type. When a comprehensive judgment is made, the distribution type without an SPOF or a node that may become a bottleneck is preferred.

However, in the distribution type, there remain the disadvantages that the network becomes the bottleneck, that the HUB or port mirroring is necessary, and that only a simple load balancing algorithm can be applied.

Non-patent Document 1allows the flexible load balancing algorithm to be applied in the distribution type. However, Non-patent Document 1cannot solve the other disadvantages. That is, Non-patent Document 1cannot implement a system of the single IP address type in which flexible load balancing is possible, and which is scalable and, which does not need a special network.

As a related art, JP Patent Kokai Publication No. JP-P2004-046442A (Patent Document 1) discloses a load distribution method. A load distribution system in this related art is constituted from a client terminal which is a computer connected to a network and application servers which are computers. The load distribution system provides the client terminal with various services such as a processing on the servers process and provision of contents.

JP Patent Kokai Publication No. JP-P2005-167425A (Patent Document 2) discloses a network telephone system, a main unit of this network telephone system, and a connection information update method using the network telephone system. In this related art, the main unit adds, changes, or deletes a corresponding IP address in a table stored in a storage unit when the main unit receives from another main unit an IP address that has been added, changed, or deleted.

JP Patent Kokai Publication No. JP-P2006-259845A (Patent Document 3) discloses a server device, a server system, and a load distribution method of the server system. In this related art, all nodes sharing a single IP address is connected to a network. Types of the nodes include a master and a slave. Only one of the nodes connected to the network becomes the master, and all of the other nodes become slaves. The network causes the nodes to logically look like a single node, using only the single IP address. The network receives an ARP (Address Resolution Protocol) request from a known/unknown client. An ARP is a protocol for resolving a MAC (Media Access Control) address from the IP address.

[Patent Document 1]
Japanese Patent Kokai Publication No. JP-P2004-046442A
[Patent Document 2]
Japanese Patent Kokai Publication No. JP-P2005-167425A
[Patent Document 3]
Japanese Patent Kokai Publication No. JP-P2006-259845A
[Non-Patent Document 1]
"Distributed Single IP Clusters Enabling Flexible Load Balancing," IPSJ SIG Technical Report, 2007-OS-106(1), Aug. 3, 2007

SUMMARY

The entire disclosures of Patent Documents 1 to 3 and Non-patent Document 1described above are incorporated herein by reference thereto.

Analyses of the related arts mentioned above in the background are given by the present invention.

There is a need in the art to provide a cluster control system of a single IP address type which performs load balancing for each client.

According to a first aspect of the present invention, there is provided a cluster control system comprising:

a plurality of clients;

a server group that is connected to each of the plurality of clients through a front network; and a master computer that is connected to the server group through a back-end network and controls the server group, wherein the server group comprises a plurality of slave computers that provide the front network with a single IP (Internet Protocol) address that is a same IP address;

each of the plurality of slave computers comprises: a responsible client table that indicate a client for which each of the plurality of slave computers is responsible; and an ARP processing unit that refers to the responsible client table when an ARP (Address Resolution Protocol) request for the single IP address has been received from each of the plurality of clients, sends an ARP response when a client that has sent the ARP request is present in the responsible client table, and does not send an ARP response when a client that has sent the ARP request is not present in the responsible client table; and the master computer comprises a responsible node determination processing unit that maintains and manages through the back-end network in the responsible client table information regarding addition, change, or deletion of a client for which each of the plurality of slave computers is responsible.

According to a second aspect of the present invention, there is provided a cluster control method comprising:

connecting each of a plurality of clients and a server group through a front network;

connecting through a back-end network the server group with a master computer that controls the server group;

providing the front network with a single IP (Internet Protocol) address to cause a plurality of slave computers included in the server group to seem to have a same IP address;

by each of the plurality of slave computers, referring to a responsible client table indicating a client for which each of the plurality of slave computers is responsible when an ARP (Address Resolution Protocol) request for the single IP address has been received by the server group from each of the plurality of clients, sending an ARP response when a client that has sent the ARP request is present in the responsible client table, and not sending an ARP response when a client that has sent the ARP request is not present in the responsible client table; and by the master computer, maintaining and managing through the back-end network in the responsible client table information regarding addition, change, or deletion of a client for which each of the plurality of slave computers is responsible and sending an ARP response to a client when the client is added.

According to a third aspect of the present invention, there is provided a slave computer, one of a plurality of slave computers that are connected to a plurality of clients through a front network and provide the front network with a single IP (Internet Protocol) address that is a same IP address, comprising:

a responsible client table that indicates a client for which each of the plurality of slave computers is responsible; and an ARP processing unit that refers to the responsible client table when an ARP (Address Resolution Protocol) request for the single IP address has been received from one of the plurality of clients and sends an ARP response when a client that has sent the ARP request is present in the responsible client table, and otherwise does not send the ARP response, wherein a client in the responsible client table is added, changed, or deleted by a master computer connected through a back-end network.

According to a fourth aspect of the present invention, there is provided a master computer connected through a back-end network to a plurality of slave computers that are connected to a plurality of clients through a front network and provide the front network with a single IP address that is a same IP (Internet Protocol) address, and controlling the plurality of slave computers, comprising:

a responsible node determination processing unit that performs through the back-end network addition, change, or deletion of a client in a responsible client table indicating a client for which each of the plurality of slave computers is responsible.

According to a fifth aspect of the present invention, there is provided a cluster control method comprising:

by each of a plurality of slave computers that are connected to a plurality of clients through a front network and provide the front network with a single IP (Internet Protocol) address that is a same IP address, referring to a responsible client table indicating a client for which each of the plurality of slave computers is responsible when an ARP (Address Resolution Protocol) request for the single IP address has been received from one of the plurality of clients, sending an ARP response when a client that has sent the ARP request is present in the responsible client table, and otherwise not sending an ARP response; and having a client in the responsible client table added, changed, or deleted by a master computer connected through a back-end network.

According to a sixth aspect of the present invention, there is provided a program causing each of a plurality of slave computers that are connected to a plurality of clients through a front network and provide the front network with a single IP (Internet Protocol) address that is a same IP address, to execute:

referring to a responsible client table indicating a client for which each of the plurality of slave computers is responsible when an ARP (Address Resolution Protocol) request for the single IP address has been received from one of the plurality of clients, sending an ARP response when a client that has sent the ARP request is present in the responsible client table, and otherwise not sending an ARP response; and having a client in the responsible client table added, changed, or deleted by a master computer connected through a backend network.

As described above, in the present invention, load balancing is performed on an ARP protocol layer, and a different MAC (Media Access Control) address is returned for an ARP request from a client. The load balancing is thereby performed among clients. An ARP is a protocol for resolving an IP address to a MAC address.

The present invention provides the following advantage, but not restricted thereto. Flexible load balancing and extendability are realized in a single IP address type cluster system.

BRIEF DESCRIPTION OF THE DRAWINGS

FIG. 3 includes diagrams showing configurations of tables in the first exemplary embodiment;

PREFERRED MODES

Figure 1:
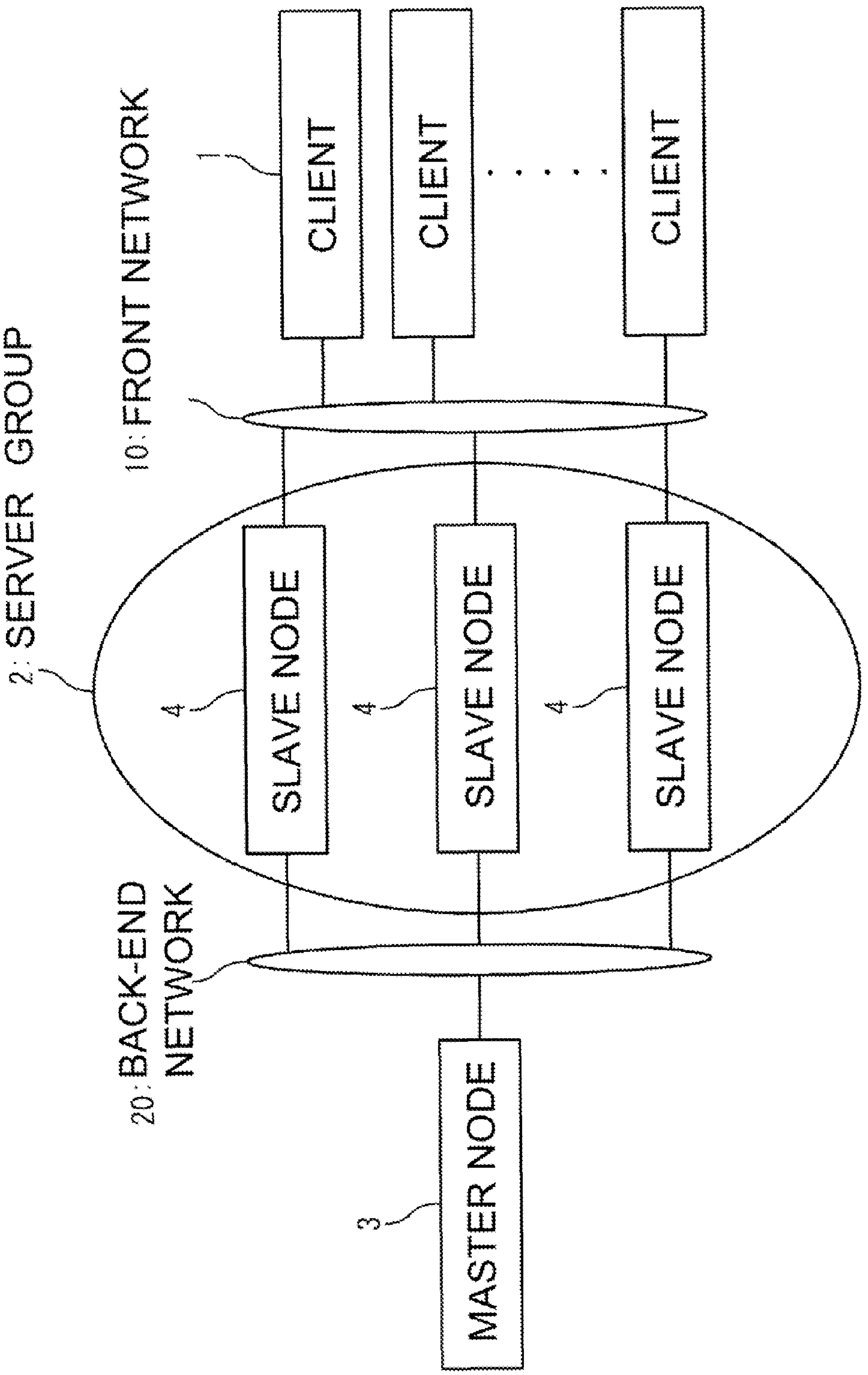
FIG. 1 is a (block) diagram showing a system configuration in a first exemplary embodiment.

A cluster control system in a first development mode may be the cluster control system according to the first aspect.

In a cluster control system according in a second development mode, each of the plurality of slave computers may further comprise an ARP notification unit that, when receiving an ARP request from a client that is not present in the responsible client table, notifies to the master computer an IP address and a MAC (Media Access Control) address of the client as a new client.

In a cluster control system in a third development mode, each of the plurality of slave computers may further comprise a notification flag for determining whether or not to notify the IP address and the MAC address of the client; and the ARP notification unit may determine whether or not to notify an IP address and a MAC address of the client by checking the notification flag.

In a cluster control system in a fourth development mode, the master computer may further comprise: a client assignment table that stores assignment of a client to each of the plurality of slave computers; and a slave node table that manages a status of each of the plurality of slave computers; and the responsible node determination processing unit may refer to the client assignment table and the slave node table when detecting that each of the plurality of slave computers has received an ARP request from the new client, add the IP address and the MAC address of the new client to a responsible client table of one of the plurality of slave computers when the one of the plurality of slave computers is already assigned to the new client, and refer to the slave node table when none of the plurality of slave computers is assigned to the new client, select one of the plurality of slave computers, and add the IP address and the MAC address of the new client to a responsible client table of the selected slave computer.

In a cluster control system in a fifth development mode, the responsible node determination processing unit may add or delete an IP address and a MAC address of a client in the responsible client table of each of the plurality of slave computers to perform reassignment so that loads on the plurality of slave computers become equal, when detecting increase or decrease in the number of slave computers in the slave node table or when detecting unequal loads on the plurality of slave computers.

In a cluster control system in a sixth development mode, the responsible node determination processing unit may transmit data including a command, an IP address, and a MAC address to each of the plurality of slave computers; the command may be classified into types of an addition command, a deletion command, and a clear command; and each of the plurality of slave computers may add, delete, or clear the IP address and the MAC address in the responsible client table according to the command when receiving the data including the command, the IP address, and the MAC address, and send an ARP response to a client specified by the IP address and the MAC address when the command is an addition command, and return to the master computer information indicating whether or not the process according to the command has been normally finished.

A computer in a seventh development mode may be a computer used as one of the plurality of slave computers in the cluster control system.

A computer in an eighth development mode may be a computer used as the master computer in the cluster control system.

A cluster control method in a ninth development mode may be a cluster control method according to the second aspect.

A cluster control method in a tenth mode may further comprise, by each of the plurality of slave computers, when receiving an ARP request from a client that is not present in the responsible client table, notifying to the master computer an IP address and a MAC (Media Access Control) address of the client as a new client.

A cluster control method in an eleventh development mode may further comprise determining whether or not to notify an IP address and a MAC address of the client by checking a notification flag for determining whether or not to notify the IP address and the MAC address of the client.

A cluster control method in a twelfth development mode may further comprise: providing the master computer with a client assignment table that stores assignment of a client to each of the plurality of slave computers; providing the master computer with a slave node table that manages a status of each of the plurality of slave computers; referring to the client assignment table and the slave node table when detecting that each of the plurality of slave computers has received an ARP request from the new client; by the master computer, adding the IP address and the MAC address of the new client to a responsible client table of one of the plurality of slave computers when the one of the plurality of slave computers is already assigned to the new client; and by the master computer, referring to the slave node table when none of the plurality of slave computers is assigned to the new client, selecting one of the plurality of slave computers, and adding the IP address and the MAC address of the new client to a responsible client table of the selected slave computer.

A cluster control method in a thirteenth development mode may further comprise adding or deleting an IP address and a MAC address of a client in a responsible client table of each of the plurality of slave computers to perform reassignment so that loads on the plurality of slave computers become equal, when detecting increase or decrease in the number of slave computers in the slave node table or when detecting unequal loads on the plurality of slave computers.

A cluster control method in a fourteenth development mode may further comprise: by the master computer, transmitting data including a command, an IP address, and a MAC address to each of the plurality of slave computers; and, by each of the plurality of slave computers, adding, deleting, or clearing the IP address and the MAC address in the responsible client table according to the command when receiving the data including the command, the IP address, and the MAC address, and returning to the master computer information indicating whether or not the process according to the command has been normally finished, the command being classified into types of an addition command, a deletion command, and a clear command.

A program in a fifteenth development mode may cause a computer to execute an operation of each of the plurality of slave computers in the cluster control method.

A program in a sixteenth development mode may cause a computer to execute an operation of the master computer in the cluster control method.

A slave computer in a seventeenth development mode may be the slave computer according to the third aspect.

A slave computer in an eighteenth development mode may further comprises an ARP notification unit that, when receiving an ARP request from a client that is not present in the responsible client table, notifies to the master computer an IP address and a MAC (Media Access Control) address of the client as a new client.

A slave computer in a nineteenth development mode may further comprises a notification flag for determining whether or not to notify an IP address and a MAC address of the client, wherein the ARP notification unit determines whether or not to notify the IP address and the MAC address of the client by checking the notification flag.

A master computer in a twentieth development mode may be the master computer according to the fourth aspect.

A cluster control system in a twenty-first development mode may comprise the slave computer and the master computer.

In a cluster control system in a twenty-second development mode, the master computer may further comprise: a client assignment table that stores assignment of a client to each of the plurality of slave computers; and a slave node table that manages a status of each of the plurality of slave computers; and the responsible node determination processing unit refers to the client assignment table and the slave node table when detecting that each of the plurality of slave computers has received an ARP request from the new client, adds the IP address and the MAC address of the new client to a responsible client table of one of the plurality of slave computers when the one of the plurality of slave computers is already assigned to the new client, and refers to the slave node table when none of the plurality of slave computers is assigned to the new client, selects one of the plurality of slave computers, and adds the IP address and the MAC address of the new client to a responsible client table of the selected slave computer.

In a cluster control system in a twenty-third development mode, the responsible node determination processing unit may add or delete an IP address and a MAC address of a client in a responsible client table of each of the plurality of slave computers to perform reassignment so that loads on the plurality of slave computers are equal, when detecting increase or decrease in the number of slave computers in the slave node table or when detecting unequal loads on the plurality of slave computers.

In a cluster control system in a twenty-fourth development mode, the responsible node determination processing unit may transmit data including a command, an IP address, and a MAC address to each of plurality of the slave computers; the command may be classified into types of an addition command, a deletion command, and a clear command; and each of the plurality of slave computers may add, delete, or clear the IP address and the MAC address in the responsible client table according to the command when receiving the data including the command, the IP address, and the MAC address, and transmit an ARP response to a client specified by the IP address and the MAC address when the command is an addition command, and return to the master computer information indicating whether or not the process according to the command has been normally finished.

A cluster control method in a twenty-fifth development mode may be the cluster control method according to the fifth aspect.

A program in a twenty-sixth development mode may be the program according to the sixth aspect.

<First Exemplary Embodiment>

A first exemplary embodiment will be described below with reference to the drawings.

FIG. 1 shows a system configuration of a cluster control system of the present exemplary embodiment.

The cluster control system of the present exemplary embodiment comprises a plurality of clients 1 (1-i, i=1~n: n being the number of clients), a front network 10, a server group 2, a back-end network 20, and a master node 3.

Each of the clients 1 (1-i, i=1~n) communicates with the server group 2 through the front network 10.

The server group 2 provides the front network 10 with a single IP (Internet Protocol) address, thereby causing the server group 2 itself to look as if it were one server. It means that the server group 2 looks as one server having the single IP address, as seen from the clients 1 (1-i, i=1~ n). The server group 2 communicates with the master node 3 through the back-end network 20. The server group 2 comprises a plurality of slave nodes 4 (4-j, j=1~m: m being the number of slave nodes).

The master node 3 is connected to the server group 2 through the back-end network 20 and controls the server group 2.

Each of the plurality of slave nodes 4 (4-j, j=1~m) is connected to the front network 10 and the back-end network 20 and communicates with the clients 1 (1-i, i=1~n) and the master node 3. Each of the slave nodes 4 (4–j, j=1~m) has a different IP address for the back-end network 20 for each slave node 4 (4–j, j=1~m), so that communication specifying a specific one of the slave nodes (4–j, j=1~m) becomes possible.

As an example of the clients 1 (1–i, i=1~n), the master node 3, and the slave nodes 4 (4–j, j=1~m), a computer such as a PC (personal computers), a thin client terminal/server, a work stations, a main frame, and a super computer may be considered. Actually, however, the examples of the clients 1 (1–i, i=1~n), the master node 3, and the slave nodes 4 (4–j, j=1~m) are not limited to these examples.

As an example of each of the front network 10 and the back-end network 20, the Internet, a LAN (Local Area Network), a wireless LAN (Wireless LAN), a cable television (CATV) line, a fixed telephone network, a cellular telephone network, or a dedicated line may be considered. Actually, however, examples of the front network 10 and the back-end network 20 are not limited to these examples.

As restrictions, it is assumed that the front network 10 is an IP network, and the slave nodes 4 (4–j, j=1~m) which belong to the server group 2 all belong to a same segment. Belonging to the same segment means that no router is interposed, and an ARP (Address Resolution Protocol) request is broadcast to all the slave nodes 4 (4–j, j=1~m). An ARP is a protocol for resolving a MAC (Media Access Control) address from an IP address.

The back-end network 20 is not necessarily limited to an IP network, and may be any network capable of performing communication when some address is specified.

<Internal Configurations of Master Node and Slave Node>

Figure 2:
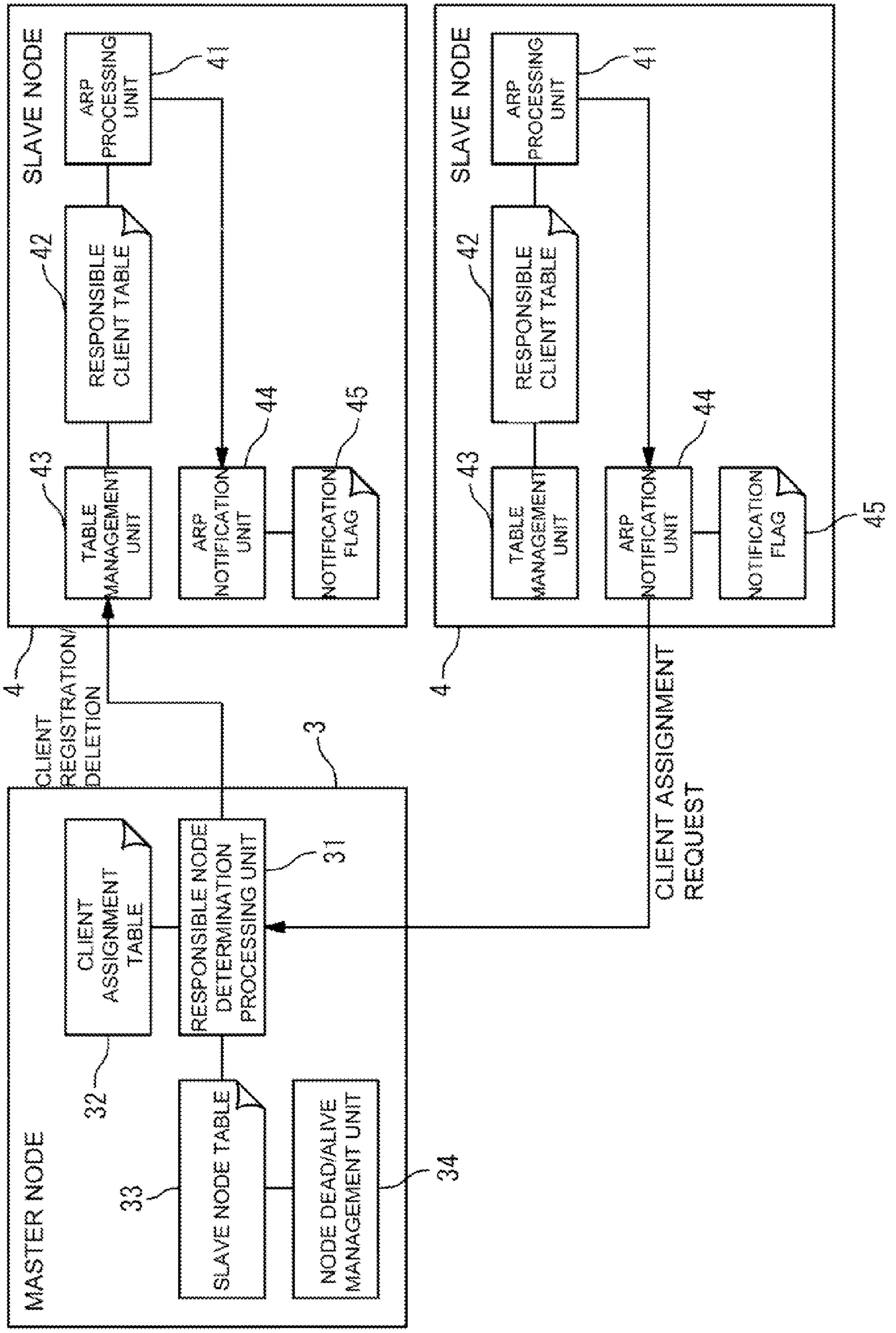
FIG. 2 is a (block) diagram showing internal configurations of a master node and a slave node in the first exemplary embodiment.

Internal configurations of the master node 3 and each of the slave nodes 4 (4–j, j=1~m) will be described, with reference to FIG. 2.

The master node 3 comprises a responsible node determination processing unit 31, a client assignment table 32, a slave node table 33, and a node dead/alive management unit 34.

The responsible node determination processing unit 31 determines to which one of the slave nodes 4 (4–j, j=1~m) a new one of the clients 1 (1–i, i=1~n) is assigned. The responsible node determination processing unit 31 performs a process of issuing an add command, a deletion command, or a clear command to the responsible one of the slave nodes 4 (4–j, j=1~m). The responsible node determination processing unit 31 uses information in the client assignment table 32 and the slave node table 33 in order to determine the responsible one of the slave nodes 4 (4–j, j=1~m) to which the new one of the clients 1 (1–i, i=1~n) is assigned.

The client assignment table 32 is a table held by the master node 3. The client assignment table 32 stores which one of the clients 1 (1–i, i=1~n) is currently assigned to the slave nodes 4 (4–j, j=1~m). The client assignment table 32 stores a time at which an ARP request has arrived last from the one of the clients 1 (1–i, i=1~n).

The slave node table 33 is a table held by the master node 3. The slave node table 33 stores a current status of each of the slave nodes 4 (4–j, j=1~m).

The node dead/alive management unit 34 manages a status of each of the slave nodes 4 (4–j, j=1~m). To take an example, the node dead/alive management unit 34 checks whether or not each of the slave nodes 4 (4–j, j=1~m) is normally activated by a method such as the one using "ping".

Each of the slave nodes 4 (4–j, j=1~m) comprises an ARP processing unit 41, a responsible client table 42, a table management unit 43, an ARP notification unit 44, and a notification flag 45.

The ARP processing unit refers to the responsible client table 42, in response to an ARP request from the front network 10, and selectively discards an ARP response. The ARP processing unit 41 refers to the responsible client table 42, searches for the IP address of one of the clients 1 (1–i, i=1~n) which has sent the ARP request, and sends an ARP response when the IP address of the one of the clients 1 (1–i, i=1~n) which has sent the ARP request is in the responsible client table 42. When the IP address of the one of the clients 1 (1–i, i=1~n) which has sent the ARP request is not in the responsible client table 42, the ARP processing unit 41 does not send the ARP response.

The responsible client table 42 is a table held by each of the slave nodes 4 (4–j, j=1~m). The responsible client table 42 stores a time when an access request has arrived last from one of the clients 1 (1–i, i=1~n).

The table management unit 43 receives the client add, delete, or clear command from the master node 3, and modifies the associate client table 42 according to the command.

The ARP notification unit 44 notifies to the master node 3 reception of the ARP request from the one of the clients that is not in the responsible client table 42, according to an instruction from the ARP processing unit 41. The ARP notification unit 44 transmits a client assignment request to the master node 3 as a notification to the master node 3. The client assignment request includes the IP address and the MAC address of the one of the clients 1 (1–i, i=1~n) that is not in the responsible client table 42. In this case, the ARP notification unit 44 determines whether or not to notify reception of the ARP request to the master node 3 by a notification flag 45.

The reason for provision of the notification flag 45 is as follows. When reception of the ARP requests is received from all of the slave nodes 4 (4–j, j=1~m), a load on the master node 3 increases. Thus, the notification flag 45 is provided so as to limit the slave nodes 4 (4–j, j=1~m) that notify reception of the ARP requests. Naturally, the number of the slave nodes 4 (4–j, j=1~m) that perform the notification does not need to be limited to one, and the notification flag 45 may be set at a plurality of the slave nodes 4 (4–j, j=1~m) so as to ensure reliability.

<Details of Tables>

Details of the above-mentioned tables (client assignment table 32, the slave node table 33, and the responsible client table 42) will be described with reference to FIG. 3.

The client assignment table 32 includes fields of "client IP address," "client MAC address," "assigned slave node IP address," and "last ARP time."

The slave node table 33 includes fields of "slave node IP address," "status," and "last access time."

The responsible client table 42 includes fields of "client IP address," "client MAC address," and "last access time."

Next, the fields included in the respective tables will be described.

The field of "client IP address" stores the IP address of each of the clients 1 (1–i, i=1~n). The field of "client MAC address" stores the MAP address of each of the clients 1 (1–i, i=1~n). When there are the IP address and the MAC address of only one of the clients, each of the slave nodes 4 (4–j, j=1~m) can prepare a packet that sends an ARP response to the one of the clients alone.

The fields of "assigned slave node IP address" and "slave node IP address" store the IP addresses of the slave nodes 4 (4–j, j=1~m). The field of "assigned slave node IP address" stores the IP address of one of the slave nodes 4 (4–j, j=1~m) assigned to one of the clients 1 (1–i, i=1~n) corresponding to the "client IP address." The field of "slave node IP address"

stores the IP address of each of the slave nodes 4 (4-j, j=1~m) belonging to the back-end network 20.

The IP addresses of the slave nodes 4 (4-j, j=1~m) are an IP address assigned to the back-end network 20. As described above, however, the back-end network 20 is not limited to the IP network. It may be so arranged that each of the slave nodes 4 (4-j, j=1~m) is individually accessed through some network.

The field of "last ARP time" shows a time at which an ARP request has last arrived from one of the clients 1 (1-i, i=1~n). The "last ARP time" is stored in order to delete entry of the one of the clients 1 (1-i, i=1~n) after a certain period.

The field of "status" shows whether each of the slave node 4 (4-j, j=1~m) is normally activated to be connected to the networks. That is, the field of "status" shows a network connection status of each of the slave nodes 4 (4-j, j=1~m).

The field of "last access time" shows a time at which an access that passed through the network has been made last. The field of "last access time" of the slave node table 33 shows a time at which an access has been made last to the master node 3 from one of the slave nodes 4 (4-j, j=1~m). The field of "last access time" of the responsible client table 42 shows a time at which an access has been made last to each of the slave nodes 4 (4-j, j=1~m) from one of the clients 1 (1-i, i=1~n). The "last access time" is stored in order to periodically check the state of communication, or to check whether communication has been recovered from an error state.

<Operation Flow of Responsible Node Determination Process Unit>

Figure 4:
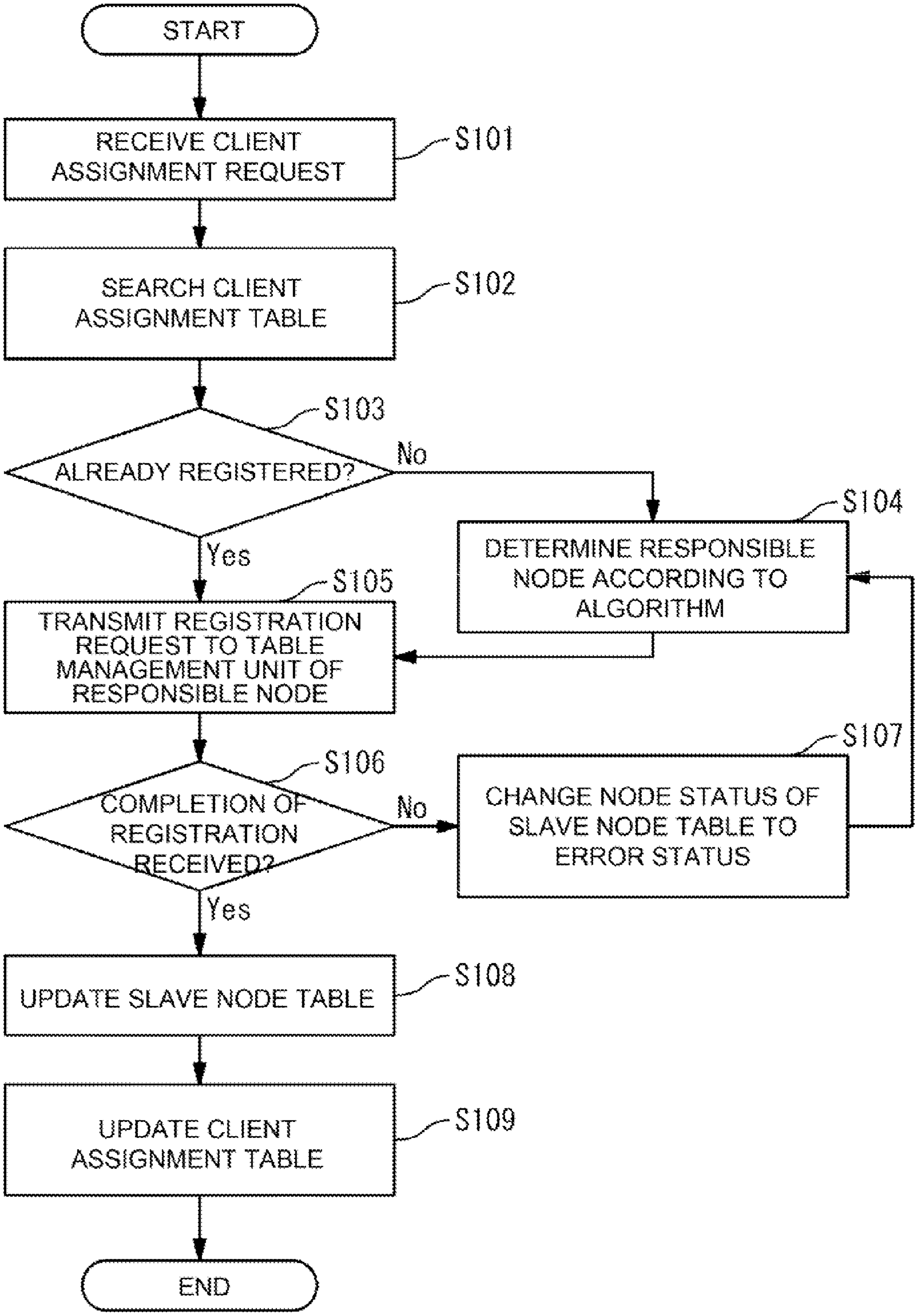
FIG. 4 is a flowchart showing a (operation) flow of a responsible node determination processing unit in the first exemplary embodiment.

An operation flow of the responsible node determination processing unit 31 of the master node 3 will be described with reference to FIG. 4.

(1) Step S101

First, the responsible node determination processing unit 31 receives a new client assignment request through the ARP notification unit 44 of one of the slave nodes 4 (4-j, j=1~m).

(2) Step S102

The responsible node determination processing unit 31 searches the client assignment table 32, based on the IP address of one of the clients 1 (1-i, i=1~n) included in the client assignment request.

(3) Step S103

The responsible node determination processing unit 31 checks whether the IP address of the one of the clients 1 (1-i, i=1~n) and the IP address of one of the slave nodes 4 (4-j, j=1~m) corresponding to the IP address of the one of the clients 1 (1-i, i=1~n) are registered in the client assignment table 32.

(4) Step S104

When at least one of the IP address of the one of the clients 1 (1-i, i=1~n) and the IP address of the one of the slave nodes 4 (4-j, j=1~m) corresponding to the IP address of the one of the clients 1 (1-i, i=1~n) is not registered in the client assignment table 32, the responsible node determination processing unit 31 determines one of the slave nodes 4 (4-j, j=1~m) which newly becomes responsible the one of the clients 1 (1-i, i=1~n). The manner of the determination should be based on simple round robin, or a complex computation such as hashing using the client IP address, or assignment according to a load status of each of the slave nodes 4 (4-j, j=1~m). A flexible load balancing algorithm may be therefore selected.

(5) Step S105

When the IP address of the one of the clients 1 (1-i, i=1~n) and the IP address of the one of the slave nodes 4 (4-j, j=1~m) corresponding to the IP address of the one of the clients 1 (1-i, i=1~n) are already registered in the client assignment table 32, the responsible node determination processing unit 31 transmits a request for addition of the IP address and the MAC address of the one of the clients 1 (1-i, i=1~n) to the table management unit 43 of the one of the slave nodes 4 (4-j, j=1~m) corresponding to the IP address of the one of the clients I (1-i, i=1~n). Alternatively, when the responsible node determination processing unit 31 newly determines the one of slave nodes 4 (4-j, j=1~m) which takes in charge of the one of the clients 1 (1-i, i=1~n), the responsible node determination processing unit 31 transmits a command that orders the one of the slave nodes 4 (4-j, j=1~m) to newly become responsible for the one of the clients 1 (1-i, i=1~n). That is, the responsible node determination processing unit 31 transmits the request for addition of the IP address and the MAC address of the one of the clients 1 (1-i, i=1~n) to the table management unit 43 of the one of the slave nodes 4 (4-j, j=1~m).

(6) Step S106

When the one of the slave nodes 4 (4-j, j=1~m) receives the request for addition of the IP address and the MAC address of the one of the clients 1 (1-i, i=1~n), the one of the slave nodes 4 (4-j, j=1~m) adds the IP address of the one of the clients 1 (1-i, i=1~n) in the responsible client table 42 which will be described later, and transmits to the master node 3 a notification of completion of the addition (notification of completion of addition). In this case, the master node 3 checks whether the master node 3 has received the notification of completion of addition from the one of the slave nodes 4 (4-j, j=1~m).

(7) Step S107

Unless the responsible node determination processing unit 31 cannot receive the notification of completion of addition from the one of the slave nodes 4 (4-j, j=1~m), the responsible node determination processing unit 31 brings the field of the status of the one of the slave nodes 4 (4-j, j=1~m) of the slave node table 33 to an error status, and determines a new one of the slave nodes 4 (4-j, j=1~m) which takes in charge of the one of the clients 1 other than the one of the slave nodes 4 (4-j, j=1~m). To take an example, when addition at the one of the slave nodes 4 (4-j, j=1~m) results in an error (there may be no vacancy in the responsible client table 42 or a link down may be detected on the side of the front network 10), or when a time-out occurs, the responsible node determination processing unit 31 brings the field of the status of the one of the slave nodes 4(4-j, j=1~m) of the slave node table 33 to the error status, and determines the new one of the slave nodes 4 (4-j, j=1~m) which takes in charge of the one of the clients other than the one of the slave nodes 4 (4-j, j=1~m).

(8) Step S108

When the responsible node determination unit 31 receives the notification of completion of addition from the one of the slave nodes 4 (4-j, j=1~m), the responsible node determination unit 31 updates the slave node table 33.

(9) Step S109

Further, the responsible node determination processing unit 31 updates the client assignment table 32: Then, the responsible node determination processing unit 31 completes the process.

<Operation Flow of ARP Processing Unit>

Figure 5:
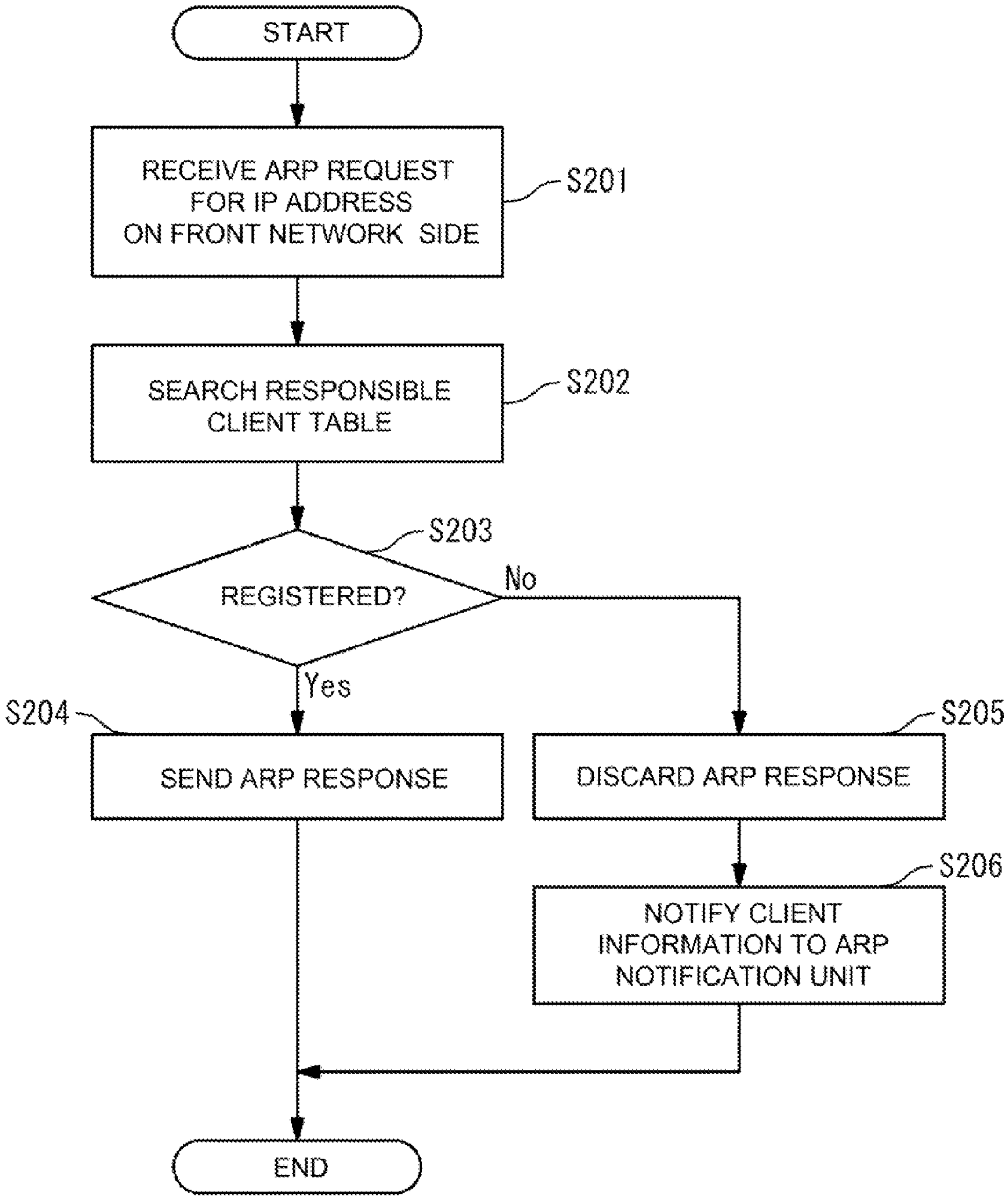
FIG. 5 is a flowchart showing a (operation) flow of an ARP processing unit in the first exemplary embodiment.

An operation flow of the ARP processing unit 41 of each of the slave nodes 4 (4-j, j=1~m) will be described with reference to FIG. 5.

(1) Step S201

The ARP processing unit 41 receives an ARP request for an IP address on the side of the front network 10 from one of the clients 1 (1-i, i=1~n).

(2) Step S202

The ARP processing unit 41 searches the responsible client table 42, based on the IP address of the one of the clients 1 (1-i, i=1~n).

(3) Step S203

The ARP processing unit 41 checks whether the IP address of the one of the clients 1 (1-i, i=1~n) is registered in the responsible client table 42.

(4) Step S204

When the IP address of the one of the clients 1 (1-i, i=1~n) is registered in the responsible client table 42, the ARP processing unit 41 sends an ARP response to the one of the clients 1 (1-i, i=1~n), and finishes the process.

(5) Step S205

When the IP address of the one of the clients 1 (1-i, i=1~n) is not registered in the responsible client table 42, the ARP processing unit 41 discards the ARP request without sending an ARP response.

(6) Step S206

The ARP processing unit 41 notifies client information to the ARP notification unit 44, thereby completing the process. The client information is information on the one of the clients not registered in the responsible client table 42, and includes the IP address and the MAC address of the one of the clients which has sent the ARP request. The ARP processing unit 41 notifies the IP address and the MAC address of the one of the clients 1 (1-i, i=1~n) to the ARP notification unit 44 and completes the process.

<Operation Flow of ARP Notification Unit>

Figure 6:
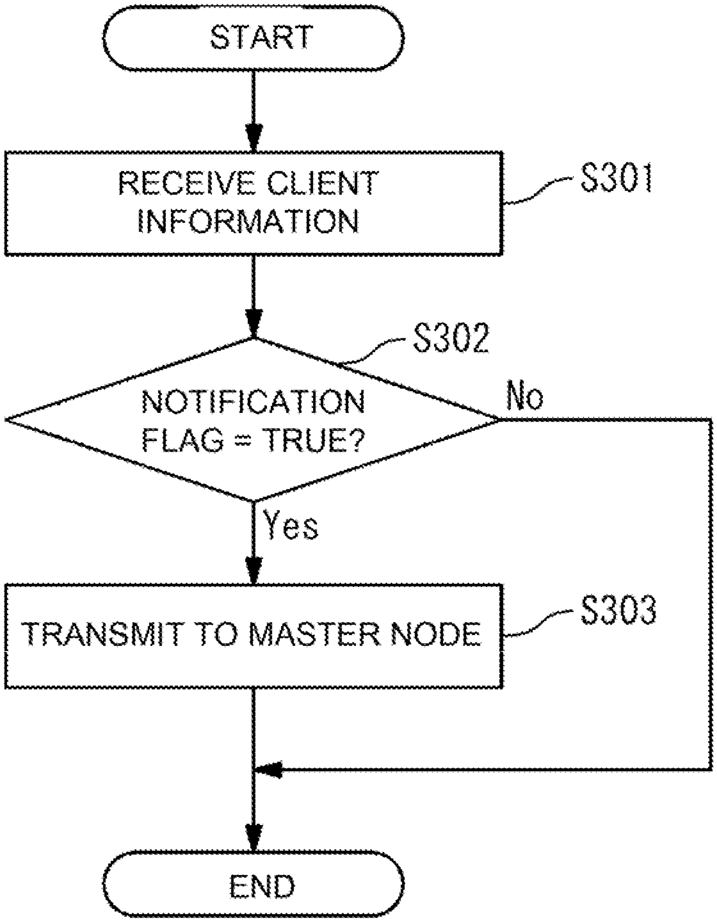
FIG. 6 is a flowchart showing a (operation) flow of an ARP notification unit in the first exemplary embodiment.

An operation flow of the ARP notification unit 44 of each of the slave nodes 4 (4-j, j=1~m) will be described with reference to FIG. 6.

(1) Step S301

When the ARP notification unit 44 receives client information from the ARP processing unit 41, the ARP notification unit 44 checks the notification flag 45. When the ARP processing unit 44 receives the IP address and the MAC address of one of the clients 1 (1-i, i=1~n) from the ARP processing unit 41, the ARP notification unit 44 checks the notification flag 45.

(2) Step S302

The ARP notification unit 44 checks whether or not the notification flag 45 is set so that notification is performed. When the notification flag 45 is "true," the ARP notification unit 44 determines that the notification flag 45 is set so that notification is performed. To take an example, when a value of the notification flag 45 is "0," the ARP notification unit 44 determines the notification flag 45 to be "false." When the value of the notification flag 45 is "1," the ARP notification unit 44 determines the notification flag 45 to be "true." In this case, the ARP processing unit 44 finishes the process without making ARP notification when the notification flag 45 is set so that notification is not performed. Herein, when the notification flag 45 is set so that notification is not performed, the ARP processing unit 44 finishes the process without transmitting the client information to the master node 3. That is, when the notification flag 45 is set so that notification is not performed, the ARP notification unit 44 finishes the process without notifying the IP address and the MAC address of the one of the clients 1 (1-i, i=1~n) to the master node 3.

(3) Step S303

When the notification flag 45 is set so that notification is performed, the ARP notification unit 44 transmits the client information to the master node 3 and completes the process. When the notification flag 45 is set so that notification is performed, the ARP notification unit 44 transmits the IP address and the MAC address of the one of the clients 1(1-i, i=1~n) to the master node 3 and completes the process.

<Content of Communication Between Master Node and Slave Node>

Figure 7:
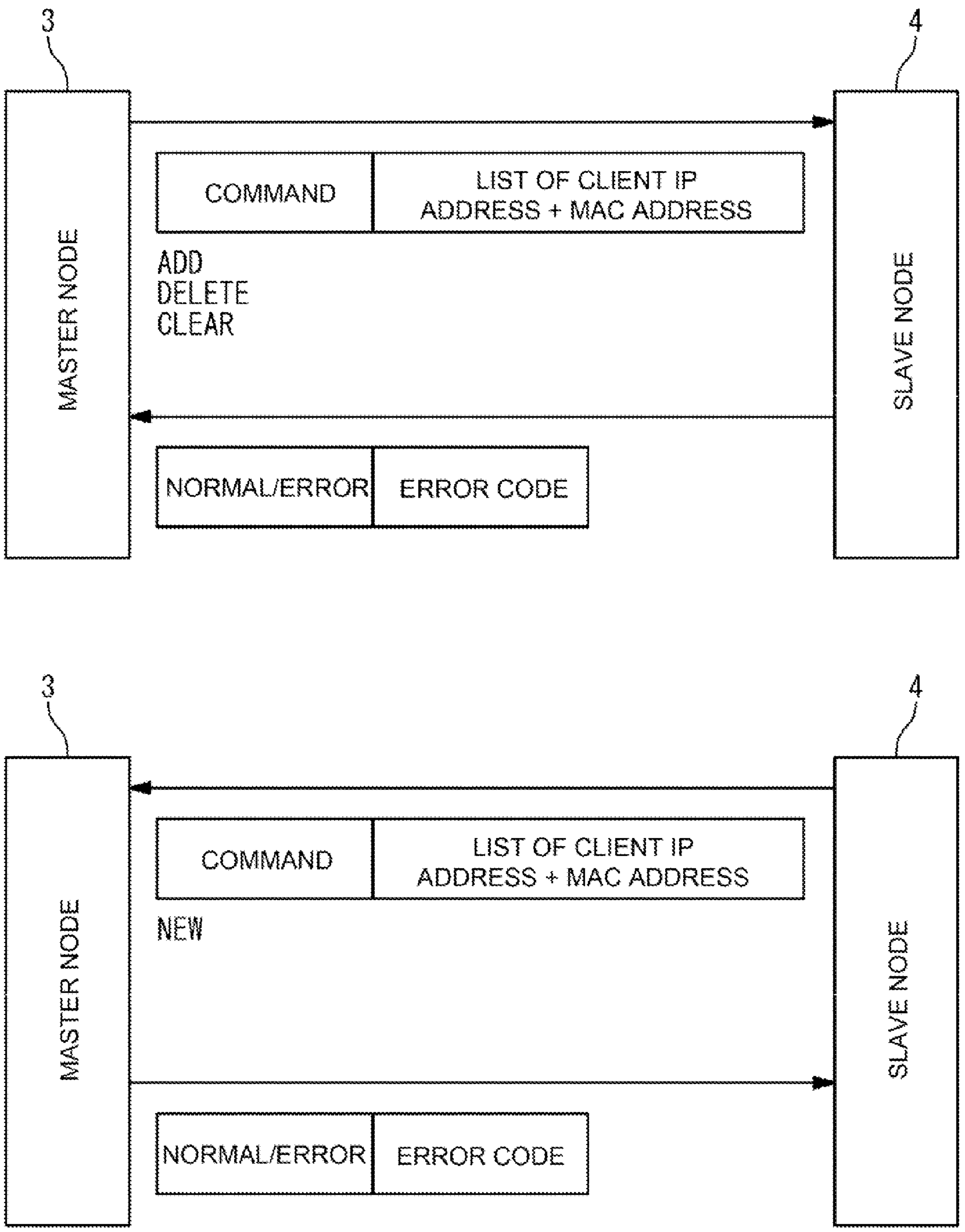
FIG. 7 is a diagram showing inter-node communication in the first exemplary embodiment.

Content communicated between the master node 3 and one of the slave nodes 4 (4-j, j=1~m) in the present exemplary embodiment will be described with reference to FIG. 7.

The content of communication from the master node 3 to the one of the slave nodes 4 (4-j, j=1~m) includes a "command" and a "list of a client IP address and a client MAC address". That is, the master node 3 transmits data including the "command" and the "list of the client IP address and the client MAC address" to the one of the slave nodes 4 (4-j, j=1~m).

When the one of the slave nodes 4 (4-j, j=1~m) receives the data including the "command" and the "list of the client IP address and the client MAC address" from the master node 3, the one of the slave nodes 4 (4-j, j=1~m) modifies the responsible client table 42, based on the "command."

The "command" is at least one of an "add command," a "delete command," and a "clear command."

When the one of the slave nodes 4 (4-j, j=1~m) receives the "add command," the one of the slave nodes 4 adds the list of the client IP address and the client MAC address that will follow the command to the responsible client table 42. Further, the one of the slave nodes 4 (4-j, j=1~m) sends an ARP response to the client having the IP address and the MAC address of the list. When an IP address and a MAC address is present, the one of the slave nodes 4 (4-j, j=1~m) can send an ARP response only to the client having the IP address and the MAC address. In this case, when the one of the slave nodes 4 (4-j, j=1~m) receives the "add command" and the responsible client table 42 is not present, the one of the slave nodes 4 (4-j, j=1~m) may newly prepare the responsible client table 42.

When the one of the slave nodes 4 (4-j, j=1~m) receives the "delete command,", the one of the slave nodes 4 (4-j, j=1~m) deletes from the responsible client table 42 the list of the client IP address and the client MAC address which will follow.

When the one of the slave nodes 4 (4-j, j=1~m) receives the "clear command," the one of the slave nodes 4 clears all lists of client IP addresses and client MAC addresses in the responsible client table 42. In this case, when the one of the slave nodes 4 (4-j, j=1~m) receives the "clear command," the one of the slave nodes 4 (4-j, j=1~m) may delete the responsible client table 42 itself.

After the one of the slave nodes 4 (4-j, j=1~m) has executed one of these commands, the one of the slave nodes 4 (4-j, j=1~m) returns to the master node 3 a "code" indicating a result of the execution.

The "code" includes a "normal completion/error" and an "error code."

Data on "normal completion/error" is data indicating whether execution of the command by the one of the slave nodes 4 (4-j, j=1~m) has been normally completed or an error has occurred in the execution of the command. When a value of this data is "0," it indicates "normal completion." When the value of this data is "1," it indicates the "error." Actually, however, the data on "normal completion/error" is not limited to these examples.

Data on the "error code" is data indicating a type of the error. The data on "normal completion" on the error code may also be categorized as a type of the error.

The content of communication from one of the slave nodes 4 (4-j, j=1~m) to the master node 3 also includes a "command" and a "list of a client IP address and a client MAC address." That is, the one of the slave nodes 4 (4-j, j=1~m) also transmits to the master node 3 data including a "command" and a "list of the client IP address and the client MAC address."

The "command" includes only a "new command." That is, the "new command" is transmitted from the one of the slave nodes 4 (4-j, j=1~m) to the master node 3.

When the master node 3 receives data including the "command" and the "list of the client IP address and the client MAC address," the master node 3 executes a responsible node determination process, based on the list of the client IP address and the client MAC address, and returns a result of execution to one of the slave nodes 4 (4-j, j=1~m).

As described above, each process in the exemplary embodiment was described. Flexible and scalable load balancing is allowed by the process, which will be described below.

EXAMPLE

A process when one of clients 1 (1-i, i=1~n) is connected to a server group 2 will be described in detail with reference to FIG. 8. The server group 2 includes four slave nodes 4 (4-j, j=1~m). The four slave nodes 4 (4-j, j=1~m) are indicated by a "slave node #1," a "slave node #2," a "slave node #3," and a "slave node #4," respectively.

First, when the one of the clients 1 (1-i, i=1~n) is first connected to the server group 2, the one of the clients 1 (1-i, i=1~n) sends an ARP request so as to resolve a MAC address from an IP address.

The ARP request is broadcast to all the slave nodes 4 (4-j, j=1~m) of the server group 2 through a switching hub or a HUB within a front network 10. That is, the switching hub or the HUB within the front network 10 broadcasts the ARP request to all the slave nodes 4 (4-j, j=1~m) of the server group 2.

Figure 8:
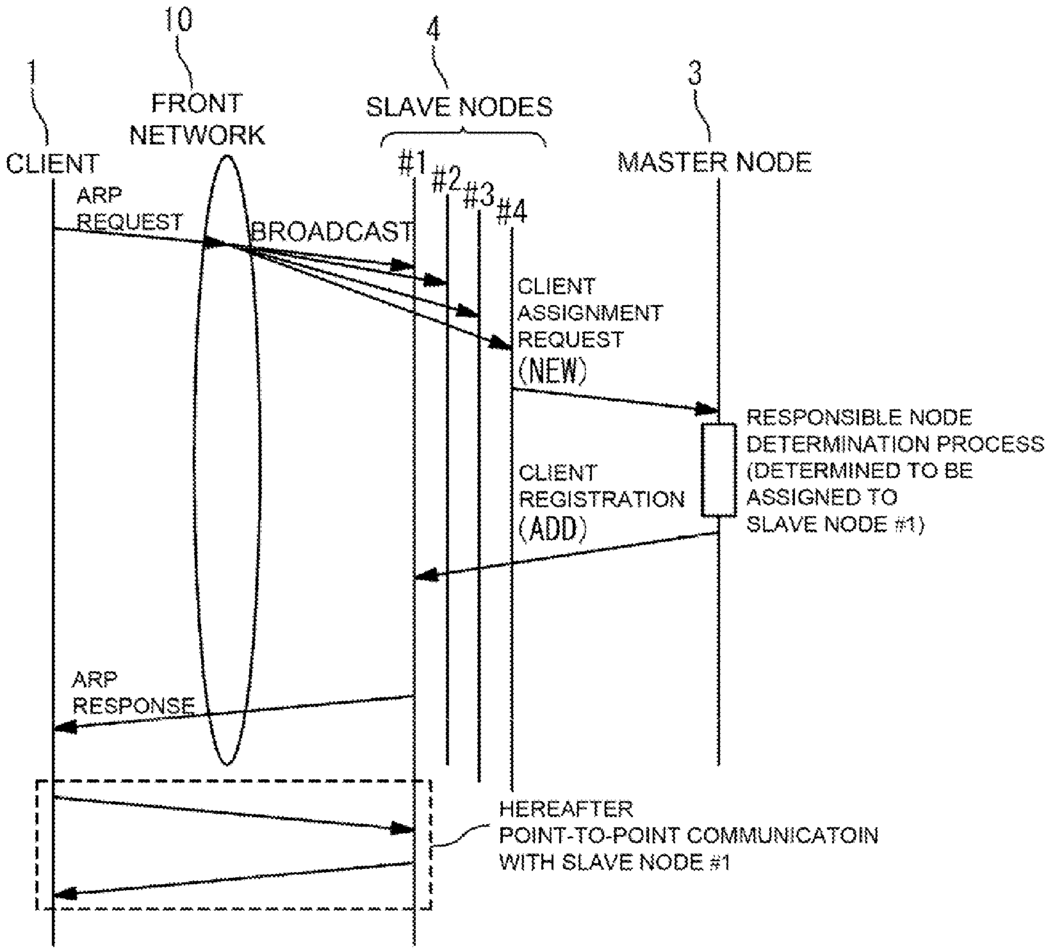
FIG. 8 is a (sequence) diagram showing a (operation) flow of a system in the first exemplary embodiment.

In the example in FIG. 8, there are four slave nodes 4 (4-j, j=1~m). Accordingly, the ARP request is duplicated into four requests, and the duplicated four requests are broadcast. This broadcasting is a function held by each device constituting an IP network. No special network configuration nor no special system is needed. Inside each of a lot of switching hubs currently in use, this broadcasting is performed by hardware using duplication. This broadcasting is therefore hard to become a performance bottleneck. Various existing techniques (such as a spanning tree) are present in order to avoid an SPOF. When these techniques are used, it is easy to increase fault-tolerance.

The ARP request thus broadcast is received by all the slave nodes 4 (4-j, j=1~m). That is, each of the slave nodes 4 (4-j, j=1~m) receives the ARP request broadcast through the switching hub or HUB within the front network 10.

When a responsible one of the slave nodes is already determined, registration has been made in the responsible client table 42 of the responsible one of the slave nodes 4 (4-j, j=1~m). Thus, an ARP response including the MAC address of the responsible one of the slave nodes 4 (4-j, j=1~m) is returned. Communication with the responsible one of the slave nodes 4 (4-j, j=1~m) is thereafter performed. Each of the slave nodes 4 (4-j, j=1~m) herein refers to the responsible client table 42 to search for the IP address of the one of the clients 1 (1-i, i=1~n) which has sent the ARP request. When the IP address of the one of the clients (1-i, i=1~n) which has sent the ARP request is in the responsible client table 42 of the responsive one of the slave nodes 4 (4-j, j=1~m), the responsive one of the slave nodes 4 (4-j, j=1~m) sends an ARP response, and performs communication with the one of the clients (1-i, i=1~n) which has sent the ARP request.

This communication is performed by specifying the MAC address of the responsible one of the slave nodes 4 (4-j, j=1~m). Thus, the communication is not broadcast, so that the network can be effectively utilized.

When the responsible one of the clients is not determined, or the responsible one of the clients is in failure, a client assignment request (new command) is transmitted from an ARP notification unit 44 to a master node 3. Each of the slave nodes 4 (4-j, j=1~m) refers to the responsible client table 42 and searches for the IP address of the one of the clients 1 (1-i, i=1~n) which has sent the ARP request. When the IP address of the one of the clients 1 (1-i, i=1~n) which has sent the ARP request is not in the responsible client table 42, each of the slave nodes 4 (4-j, j=1~m) does not send an ARP response, and transmits the client assignment request (new command) to the master node 3. When each of the slave nodes 4 (4-j, j=1~m) is in failure even if the slave node is a responsible node, naturally, the slave node does not send an ARP response and does not transmit the client assignment request (new command) to the master node 3.

When the master node 3 receives the client assignment request (new command), a responsible node determination processing unit 31 performs a responsible node determination process, and transmits a client add command (add command) to the responsible one of the slave nodes 4 (4-j, j=1~m).

In the example in FIG. 8, the master node 3 determines the slave node #1 as the responsible slave node. Thus, client addition is performed to the slave node #1. No process is performed for the other slave nodes 4 (4-j, j=1~m). That is, the master node 3 transmits the client add command (add command) to only the one of the slave nodes 4 (4-j, j=1~m) corresponding to the slave node #1.

When the one of the slave nodes 4 (4-j, j=1~m) corresponding to the slave node #1 receives the client add command (add command), the one of the slave nodes 4 (4-j, j=1~m) registers the one of the clients I (1-i, i=1~n) which has sent the ARP request in the responsible client table 42.

Further, the slave node #1 sends an ARP response to the one of the clients 1. With this arrangement, ARP resolution can be performed for the one of the clients 1 (1-i, i=1~n). Thereafter, point-to-point communication with the slave node #1 is performed. That is, the one of the slave nodes 4 (4-j, j=1~m) corresponding to the slave node #1 sends the ARP response to the one of the clients 1 (1-i, i=1~n) for which the slave node #1 is responsible, thereby establishing connection of the communication.

Each of the clients 1 (1-i, i=1~n) resends the ARP request after a certain period when there is no response for the ARP request. This resend function is a function prepared for some failure or a case where a packet is discarded on the network. It can be confirmed that this resend function is implemented on substantially all of the clients. Accordingly, if the ARP response from the slave node #1 has not arrived at the one of the clients I due to some failure, the one of the clients 1 retransmits the ARP request, and the slave node #1 transmits the ARP response again. In this case, it may be so arranged that when the slave node #1 receives the client add command (add command), the slave node #1 may transmit a plurality of ARP responses after a certain period, being prepared for a packet loss on the network.

As features of this method, the following two advantages may be pointed out.

A first advantage is that, since a load balancing algorithm is intensively executed by the master node 3, the algorithm which is flexible can be implemented. In existing distributed-type load balancing, each node must independently determine whether the node is responsible for each of the clients. Accordingly, only a simple algorithm can be implemented. In the present exemplary embodiment, however, the algorithm implementation is centralized on the master node 3. The problem is thereby solved.

A second advantage is that, since the ARP resolution is used, point-to-point communication is performed between one of the clients and a responsible one of the nodes after the ARP resolution. Extendablity is thereby high. That is, there is no portion of the network on which all packets are centralized, and when a node is added to form the network using a switching hub, performance can be extended. There may be possibly load centralization in the case of ARP broadcasting and in the case of responsive node determination by the master node 3. The ARP request, however, is not output for a while once the ARP resolution has been made. Thus, ARP resolution processing does not cause a large load on the master node 3.

<Second Exemplary Embodiment>

A second exemplary embodiment will be described below.

Figure 9:
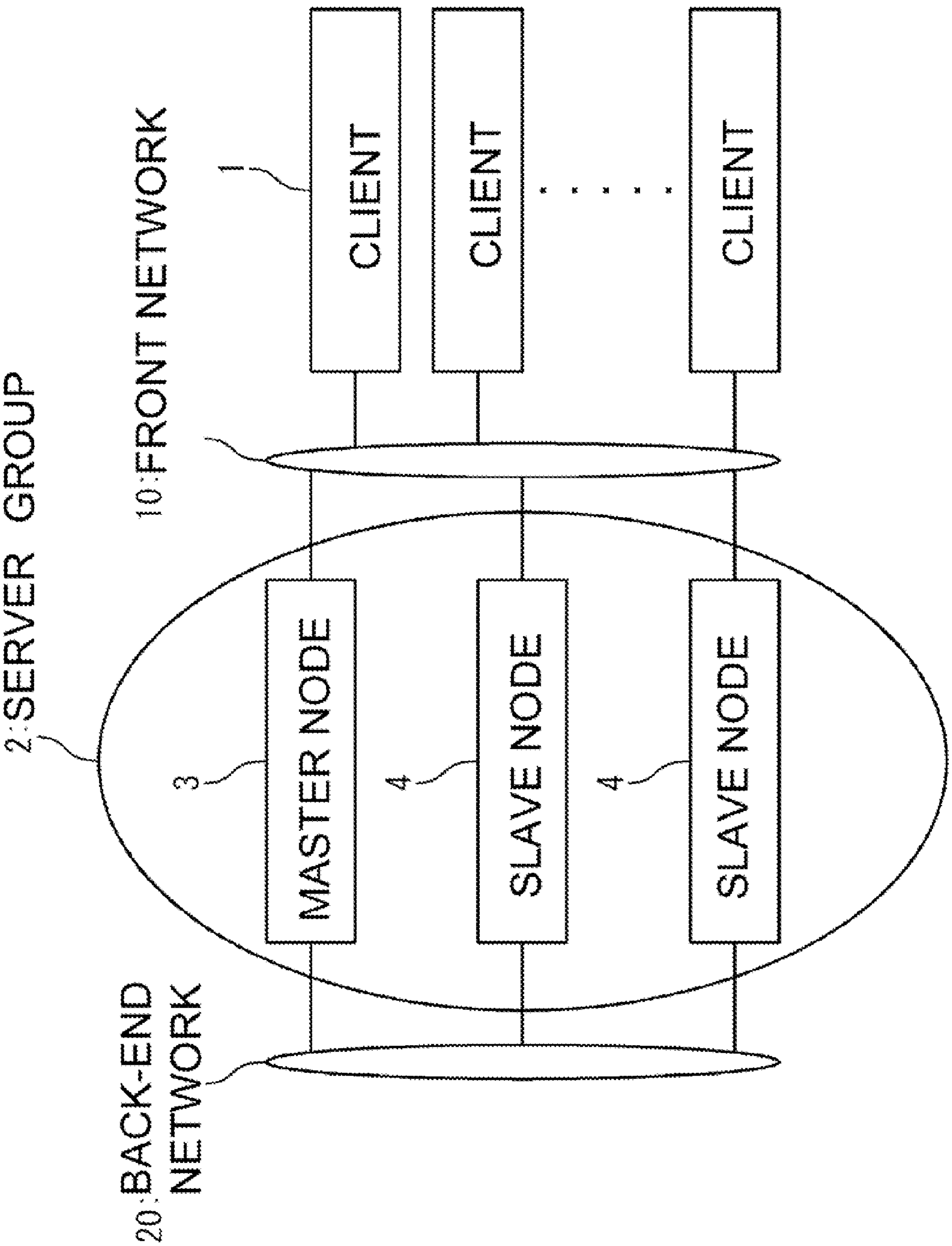
FIG. 9 is a (block) diagram showing a system configuration of a second exemplary embodiment.

FIG. 9 shows a system configuration of a cluster control system in the present exemplary embodiment.

The cluster control system in the present exemplary embodiment comprises a plurality of clients 1 (1-i, i=1~n: n being the number of the clients), a front network 10, a server group 2, and a back-end network 20.

The front network 10 has a same configuration as that shown in FIG. 1. However, a master node 3 of the back-end network 20 is located in the server group 2.

Each of the clients 1 (1-i, i=1~n), the front network 10, and the back-end network 20 has a same configuration as that in the first exemplary embodiment.

The server group 2 comprises the master node 3 and a plurality of slave nodes 4 (4-j, j=1~m: m being the number of the slave nodes). In this case, the master node 3 includes a function of each of the slave nodes 4 (4-j, j=1~m) as well.

<Internal Configurations of Master Node and Slave Node>

Figure 10:
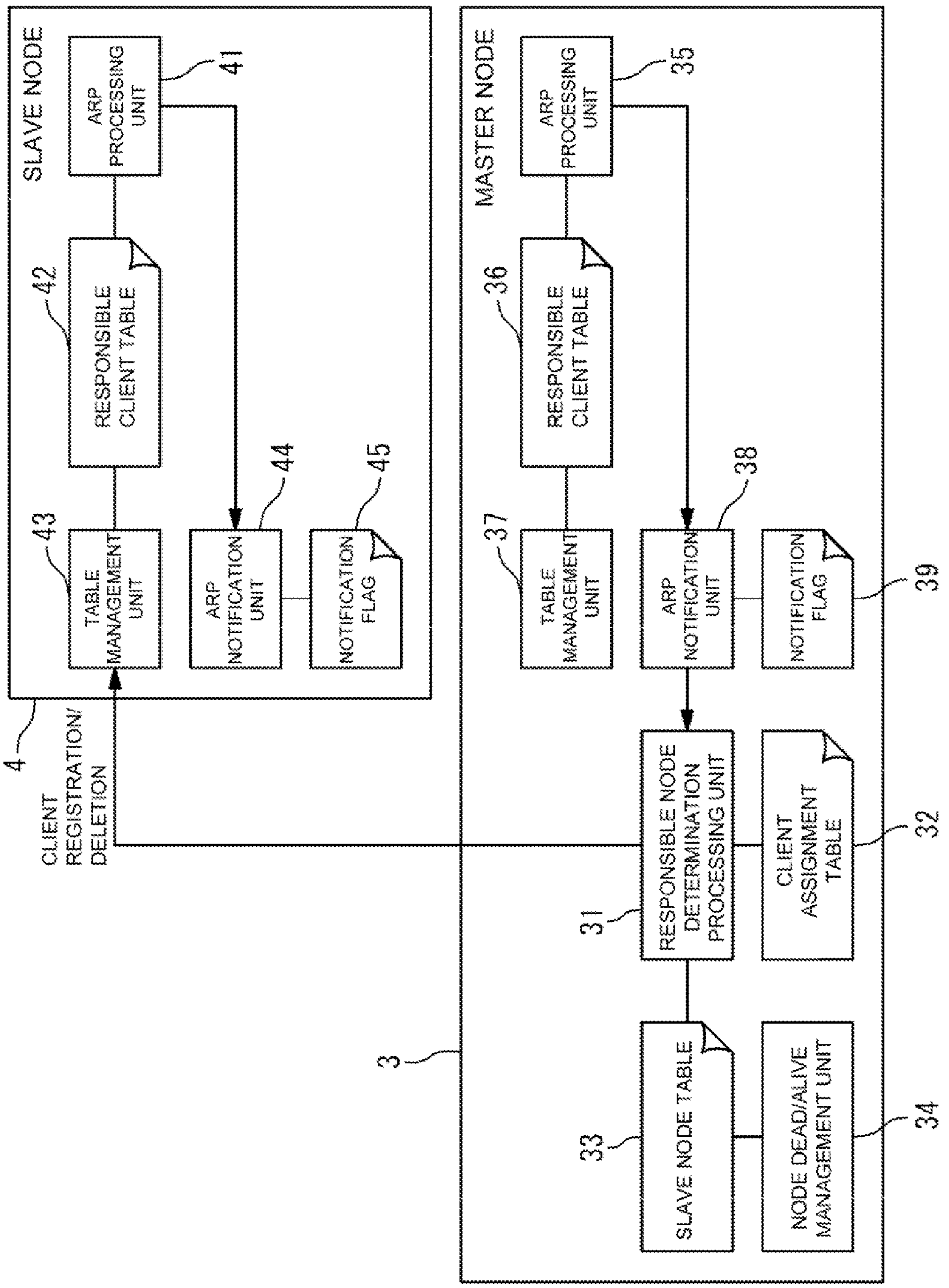
FIG. 10 is a (block) diagram showing internal configurations of a master node and a slave node in the second exemplary embodiment.

Internal configurations of the master node 3 and each of the slave nodes 4 (4-j, j=1~m) in the present exemplary embodiment will be described with reference to FIG. 10.

The master node 3 in the present exemplary embodiment includes both of a function of the master node 3 and the function of each of the slave nodes 4 (4-j, j=1~m).

The master node 3 comprises a responsible node determination processing unit 31, a client assignment table 32, a slave node table 33, a node dead/alive management unit 34, an ARP processing unit 35, a responsible client table 36, a table management unit 37, an ARP notification unit 38, and a notification flag 39.

Each of the slave nodes 4 (4-j, j=1~m) comprises an ARP processing unit 41, a responsible client table 42, a table management unit 43, an ARP notification unit 44, and a notification flag 45.

Each of the responsible node determination processing unit 31, the client assignment table 32, the slave node table 33, the node dead/alive management unit 34, the ARP processing unit 41, the responsible client table 42, the table management unit 43, the ARP notification unit 44, and the notification flag 45 has a same configuration as that in the first exemplary embodiment.

The ARP processing unit 35 has a same configuration as the ARP processing unit 41. That is, the ARP processing unit 35 corresponds to the ARP processing unit 41 in each of the slave nodes 4 (4-j, j=1~m). The responsible client table 36 has a same configuration as the responsible client table 42. That is, the responsible client table 36 corresponds to the responsible client table 42 in each of the slave nodes 4 (4-j, j=1~m).

The table management unit 37 has a same configuration as the table management unit 43. That is, the table management unit 37 corresponds to the table management unit 43 in each of the slave nodes 4 (4-j, j=1~m).

The ARP notification unit 38 has a same configuration as the ARP notification unit 44. That is, the ARP notification unit 38 corresponds to the ARP notification unit 44 in each of the slave nodes 4 (4-j, j=1~m).

The notification flag 39 has a same configuration as the notification flag 45. That is, the notification flag 39 corresponds to the notification flag 45 in each of the slave nodes 4 (4-j, j=1~m).

<Third Exemplary Embodiment>

A third exemplary embodiment will be described below.

The clients I can be distributed and assigned to the slave nodes 4 according to each exemplary embodiment described above. When a load on each slave node 4 is made to be equal, process performance that is proportional to the number of the slave nodes 4 can be obtained, as a whole.

However, depending on assignment of the clients 1, a situation occurs where loads are centralized on a specific slave node and each of the other slave nodes 4 has a small load. Further, when the slave node 4 is newly added, it doesn't make sense to add the slave node 4 unless the client is not assigned to the added slave node 4.

Further, when the slave node 4 is deleted due to a situation such as failure of the slave node 4, the client I of which the deleted slave node 4 has taken in charge so far must be reassigned to one of the other slave nodes 4.

A method of performing such reassignment will be described.

The master node 3 obtains a trigger for performing reassignment in response to a command from a manager or a notification from a different module for detecting load inequality. The responsible node determination processing unit 31 of the master node 3 performs reassignment in response to this trigger. The master node 3 transmits a client add command, a client delete command, and a client clear command to the slave node 4 according to assignment newly determined by the reassignment. Specifically, the master node 3 transmits the clear command to clear the responsible client table 42 of the slave node 4. Then, the master node 3 transmits the command of addition of the client 1 that will be newly assigned, as the client add command. The command of addition of the client 1 includes the IP address and the MAC address of the client 1.

When the slave node 4 receives the client add command, the slave node 4 adds the IP address and the MAC address included in the client add command to the responsible client table 42, and sends an ARP response to the client 1 having this IP address and this MAP address. When the client 1 receives the ARP response, the client 1 changes its ARP table. With this arrangement, the client 1 can communicate with the new slave node 4, and the reassignment can be achieved.

When the ARP table is changed during communication of the client 1 and the slave node 4 of a destination is changed, the session may be discarded depending on an application, and an error may occur. To take an example, there may be a case, such as a case where the slave node 4 has been added, where reassignment is not needed to be performed even with occurrence of an error. In such a case, the master node 3 monitors a communication status of the client 1, and performs reassignment after having waited for a timing at which there is no communication. In this case, the individual slave node 4 may monitor the communication status of the client 1, and may notify to the master node 3 a status of no communication at the timing at which there is no communication.

<Another Exemplary Embodiment>

Finally, another exemplary embodiment will be described in detail.

A cluster control system in the present exemplary embodiment comprises a plurality of clients, a plurality of computers connected to the clients, and a master computer which controls the computers. The computers are connected to a network (front network) to which the clients and the computers are connected, and a network (back-end network) to which the computers and the master computer are connected. The computers have a same IP address (single IP address) for the front network. Each of the computers has a table of the clients (responsible client table) for which each of the computers is responsible. The responsible client table is managed for maintenance such as addition, change, or deletion, by the master computer via the back-end network. When an ARP request for the single IP address arrives from the client, each computer refers to the responsible client table. Then the computer sends an ARP response when the client that has sent the ARP request is present in the responsible client table, and does not send an ARP response when the client that has sent the ARP request is not present in the responsible client table.

When the ARP request has arrived from the client that is not present in the responsible client table, each of the computers notifies the master computer of the client as a new client.

Each of the computers has a flag for determining whether or not to notify about the new client.

Further, each of the computers notifies an ARP request packet received from the client as well, in addition to the notification of the new client.

The master computer has a table (client assignment table) that stores assignment of the clients to the computers and a table (node management table (or slave node table)) for managing statuses of the computer. When the master computer detects arrival of an ARP request from the new client, the master computer refers to the client assignment table and the node management table. When the new client is already assigned, the master computer adds the IP address and the MAC address of the new client to the responsible client table of the computer. When the new client is not assigned, the master computer refers to the node management table, selects one of the computers, and adds the IP address and the MAC address of the new client to the responsible client table of the computer.

Along with detection of an increase or a decrease in the node management table and load inequality among the slave computers, the master computer performs addition, deletion, or clearing of the IP address and the MAC address of the client in the responsible client table of one of the computers.

In the cluster control system of the present invention, content of communication that flows over the network includes a command and a list of an IP address and a MAC address. As types of the command, there are an add command, a delete command, and a clear command. When each of the computers receives the command and the list of the IP address and MAC address of the client, the computer adds, deletes, or clears the IP address and the MAC address with respect to the responsible client table, according to the command. In the case of the add command, the computer sends an ARP response to the added client. The computer sends the ARP response indicating whether address resolution has been normally finished, thereby allowing control of the ARP response.

As described above, load balancing is performed on an ARP protocol layer, in the present invention. An ARP is a protocol for resolving a MAC address from an IP address. In the present invention, a different MAC address is returned for an ARP request from the client, thereby performing load balancing for each client.

According to the present invention, flexible load balancing and extendability are realized using a single IP address. Reliability can be therefore enhanced while effectively utilizing computer resources. Further, no special network is needed. Accordingly, a new investment can be minimized.

The above detailed description was directed to the exemplary embodiments of the present invention. Actually, the invention is not limited to the exemplary embodiments described above, and any change in a range not departing from the gist of the invention may be included in the present invention.

In the framework of entire disclosure of the present invention (including the claims), and based on its basic technological idea, exemplary embodiments or examples of the present invention may be modified and/or adjusted. Also it should be noted that in the framework of the claims of the present invention, any combinations or selections of various elements disclosed herein are possible.

EXPLANATIONS OF SYMBOLS

1 (–i, i=1~n) clients
10 front network
2 server group
20 back-end network
3 master node
31 responsible node determination processing unit
32 client assignment table
33 slave node table
34 node dead/alive management unit
35 ARP processing unit
36 responsible client table
37 table management unit
38 ARP notification unit
39 notification flag
4 (—i, i=1~m) slave nodes
41 ARP processing unit
42 responsible client table
43 table management unit
44 ARP notification unit
45 notification flag

What is claimed is:

1. A cluster control system comprising:

a plurality of clients;

a server group that is connected to each of the plurality of clients through a front network; and a master computer that is connected to the server group through a back-end network and controls the server group, wherein the server group comprises a plurality of slave computers that provide the front network with a single IP (Internet Protocol) address that is a same IP address;

each of the plurality of slave computers comprises: a responsible client table that indicate a client for which each of the plurality of slave computers is responsible; and an ARP processing unit that refers to the responsible client table when an ARP (Address Resolution Protocol) request for the single IP address has been received from each of the plurality of clients, sends an ARP response when a client that has sent the ARP request is present in the responsible client table, and does not send an ARP response when a client that has sent the ARP request is not present in the responsible client table; and the master computer comprises a responsible node determination processing unit that maintains and manages through the back-end network in the responsible client table information regarding addition, change, or deletion of a client for which each of the plurality of slave computers is, responsible, wherein each of the plurality of slave computers further comprises:

an ARP notification unit that, when receiving an ARP request from a client that is not present in the responsible client table, notifies to the master computer an IP address and a MAC (Media Access Control) address of the client as a new client;

each of the plurality of slave computers further comprises a notification flag for determining whether or not to notify the master computer the IP address and the MAC address of the client; and the ARP notification unit determines whether or not to notify the master computer the IP address and the MAC address of the client by checking the notification flag, wherein the notification flag is set at a plurality of slave computers to limit the number of slave computers that notify reception of the ARP requests and prevent a load of the master computer from increasing.

2. The cluster control system according to claim 1, wherein the master computer further comprises: a client assignment table that stores assignment of a client to each of the plurality of slave computers; and a slave node table that manages a status of each of the plurality of slave computers; and the responsible node determination processing unit refers to the client assignment table and the slave node table when detecting that each of the plurality of slave computers has received an ARP request from the new client, adds the IP address and the MAC address of the new client to a responsible client table of one of the plurality of slave computers when the one of the plurality of slave computers is already assigned to the new client, and refers to the slave node table when none of the plurality of slave computers is assigned to the new client, selects one of the plurality of slave computers, and adds the IF' address and the MAC address of the new client to a responsible client table of the selected slave computer.

3. The cluster control system according to claim 2, wherein the responsible node determination processing unit adds or deletes an IP address and a MAC address of a client in the responsible client table of each of the plurality of slave computers to perform reassignment so that loads on the plurality of slave computers become equal, when detecting increase or decrease in the number of slave computers in the slave node table or when detecting unequal loads on the plurality of slave computers.

4. The cluster control system according claim 1, wherein the responsible node determination processing unit transmits data including a command, an IP address, and a MAC address to each of the plurality of slave computers;

the command is classified into types of an addition command, a deletion command, and a clear command; and each of the plurality of slave computers adds, deletes, or clears the IP address and the MAC address in the responsible client table according to the command when receiving the data including the command, the IP address, and the MAC address, sends an ARP response to a client specified by the IF' address and the MAC address when the command is an addition command, and returns to the master computer information indicating whether or not the process according to the command has been normally finished.

5. A computer used as one of the plurality of slave computers in the cluster control system according to claim 1.

6. A computer used as the master computer in the cluster control system according to claim 1.

7. A cluster control method comprising:

connecting each of a plurality of clients and a server group through a front network;

connecting through a back-end network the server group with a master computer that controls the server group;

providing the front network with a single IP (Internet Protocol) address to cause a plurality of slave computers included in the server group to seem to have a same IP address;

by each of the plurality of slave computers, referring to a responsible client table indicating a client for which each of the plurality of slave computers is responsible when an ARP (Address Resolution Protocol) request for the single IP address has been received by the server group from each of the plurality of clients, sending an ARP response when a client that has sent the ARP request is present in the responsible client table, and not sending an ARP response when a client that has sent the ARP request is not present in the responsible client table;

by the master computer, maintaining and managing through the back-end network in the responsible client table information regarding addition, change, or deletion of a client for which each of the plurality of slave computers is responsible and sending an ARP response to a client when the client is added;

by each of the plurality of slave computers, when receiving an ARP request from a client that is not present in the responsible client table, notifying to the master computer an IP address and a MAC (Media Access Control) address of the client as a new client; and determining whether or not to notify the master computer an IP address and a MAC address of the client by checking a notification flag for determining whether or not to notify the master computer of the IP address and the MAC address of the client, wherein the notification flag is set at a plurality of slave computers to limit the number of slave computers that notify reception of the ARP requests and prevent a load of the master computer from increasing.

8. The cluster control method according to claim 7, further comprising: providing the master computer with a client assignment table that stores assignment of a client to each of the plurality of slave computers;

providing the master computer with a slave node table that manages a status of each of the plurality of slave computers;

referring to the client assignment table and the slave node table when detecting that each of the plurality of slave computers has received an ARP request from the new client;

by the master computer, adding the IP address and the MAC address of the new client to a responsible client table of one of the plurality of slave computers when the one of the plurality of slave computers is already assigned to the new client; and by the master computer, referring to the slave node table when none of the plurality of slave computers is assigned to the new client, selecting one of the plurality of slave computers, and adding the IP address and the MAC address of the new client to a responsible client table of the selected slave computer.

9. The cluster control method according to claim 8, further comprising:

adding or deleting an IP address and a MAC address of a client in a responsible client table of each of the plurality of slave computers to perform reassignment so that loads on the plurality of slave computers become equal, when detecting increase or decrease in the number of slave computers in the slave node table or when detecting unequal loads on the plurality of slave computers.

10. The cluster control method according to claim 7, further comprising:

by the master computer, transmitting data including a command, an IP address, and a MAC address to each of the plurality of slave computers; and by each of the plurality of slave computers, adding, deleting, or clearing the IF' address and the MAC address in the responsible client table according to the command when receiving the data including the command, the IP address, and the MAC address, and returning to the master computer information indicating whether or not the process according to the command has been normally finished, the command being classified into types of an addition command, a deletion command, and a clear command.

11. A non-transitory computer-readable recording medium, storing a program that causes a computer to execute an operation of each of the plurality of slave computers in the cluster control method according to claim 7.

12. A non-transitory computer-readable recording medium, storing a program that causes a computer to execute an operation of the master computer in the cluster control method according to claim 7.

13. A slave computer out of a plurality of slave computers that are connected to a plurality of clients through a front network and provide the front network with a single IP (Internet Protocol) address that is a same IP address, the slave computer comprising:

a responsible client table that indicates a client for which each of the plurality of slave computers is responsible; and an ARP processing unit that refers to the responsible client table when an ARP (Address Resolution Protocol) request for the single IP address has been received from one of the plurality of clients and sends an ARP response when a client that has sent the ARP request is present in the responsible client table, and otherwise does not send the ARP response, wherein a client in the responsible client table is added, changed, or deleted by a master computer connected through a back-end network;

an ARP notification unit that, when receiving an ARP request from a client that is not present in the responsible client table, notifies the master computer an IP address and a MAC (Media Access Control) address of the client as a new client, and the notification flag is set at a plurality of slave computers to limit the number of slave computers that notify reception of the ARP requests and prevent a load of the master computer from increasing.

14. A cluster control system comprising:

the slave computer according to claim 13; and a master computer connected through a back-end network to the plurality of slave computers, and controlling the plurality of slave computers, comprising a responsible node determination processing unit that performs through the back-end network addition, change, or deletion of a client in a responsible client table indicating a client for which each of the plurality of slave computers is responsible.

15. The cluster control system according to claim 14, wherein the master computer further comprises: a client assignment table that stores assignment of a client to each of the plurality of slave computers; and a slave node table that manages a status of each of the plurality of slave computers; and the responsible node determination processing unit refers to the client assignment table and the slave node table when detecting that each of the plurality of slave computers has received an ARP request from the new client, adds the IP address and the MAC address of the new client to a responsible client table of one of the plurality of slave computers when the one of the plurality of slave computers is already assigned to the new client, and refers to the slave node table when none of the plurality of slave computers is assigned to the new client, selects one of the plurality of slave computers, and adds the IF' address and the MAC address of the new client to a responsible client table of the selected slave computer.

16. The cluster control system according to claim 15, wherein the responsible node determination processing unit adds or deletes an IP address and a MAC address of a client in a responsible client table of each of the plurality of slave computers to perform reassignment so that loads on the plurality of slave computers are equal, when detecting increase or decrease in the number of slave computers in the slave node table or when detecting unequal loads on the plurality of slave computers.

17. The cluster control system according to claim 14, wherein the responsible node determination processing unit transmits data including a command, an IP address, and a MAC address to each of plurality of the slave computers;

the command is classified into types of an addition command, a deletion command, and a clear command; and each of the plurality of slave computers adds, deletes, or clears the IP address and the MAC address in the responsible client table according to the command when receiving the data including the command, the IP address, and the MAC address, and transmits an ARP response to a client specified by the IP address and the MAC address when the command is an addition command, and returns to the master computer information indicating whether or not the process according to the command has been normally finished.

18. A cluster control method comprising:

by each of a plurality of slave computers that are connected to a plurality of clients through a front network and provide the front network with a single IP (Internet Protocol) address that is a same IF' address, referring to a responsible client table indicating a client for which each of the plurality of slave computers is responsible when an ARP (Address Resolution Protocol) request for the single IP address has been received from one of the plurality of clients, sending an ARP response when a client that has sent the ARP request is present in the responsible client table, and otherwise not sending an ARP response;

having a client in the responsible client table added, changed, or deleted by a master computer connected through a back-end network;

by each of the plurality of slave computers, when receiving an ARP request from a client that is not present in the responsible client table, notifying to the master computer an IP address and a MAC (Media Access Control) address of the client as a new client; and determining whether or not to notify the master computer an IP address and a MAC address of the client by checking a notification flag for determining whether or not to notify the master computer of the IP address and the MAC address of the client, wherein the notification flap is set at a plurality of slave computers to limit the number of slave computers that notify reception of the ARP requests and prevent a load of the master computer from increasing.

19. A non-transitory computer-readable recording medium, storing a program that causes each of a plurality of slave computers that are connected to a plurality of clients through a front network and provide the front network with a single IP (Internet Protocol) address that is a same IP address, to execute:

referring to a responsible client table indicating a client for which each of the plurality of slave computers is responsible when an ARP (Address Resolution Protocol) request for the single IP address has been received from one of the plurality of clients, sending an ARP response when a client that has sent the ARP request is present in the responsible client table, and otherwise not sending an ARP response; and having a client in the responsible client table added, changed, or deleted by a master computer connected through a back-end network, wherein each of the plurality of slave computers further comprises:

an ARP notification unit that, when receiving an ARP request from a client that is not present in the responsible client table, notifies to the master computer an IP address and a MAC (Media Access Control) address of the client as a new client;

each of the plurality of slave computers further comprises a notification flag for determining whether or not to notify the master computer the IP address and the MAC address of the client; and the ARP notification unit determines whether or not to notify the master computer the IP address and the MAC address of the client by checking the notification flag, wherein the notification flag is set at a plurality of slave computers to limit the number of slave computers that notify reception of the ARP requests and prevent a load of the master computer from increasing.

* * * * *